April 25, 1933. J. T. TUCKER 1,905,578
FRUIT PEELER
Filed March 29, 1930 3 Sheets-Sheet 2
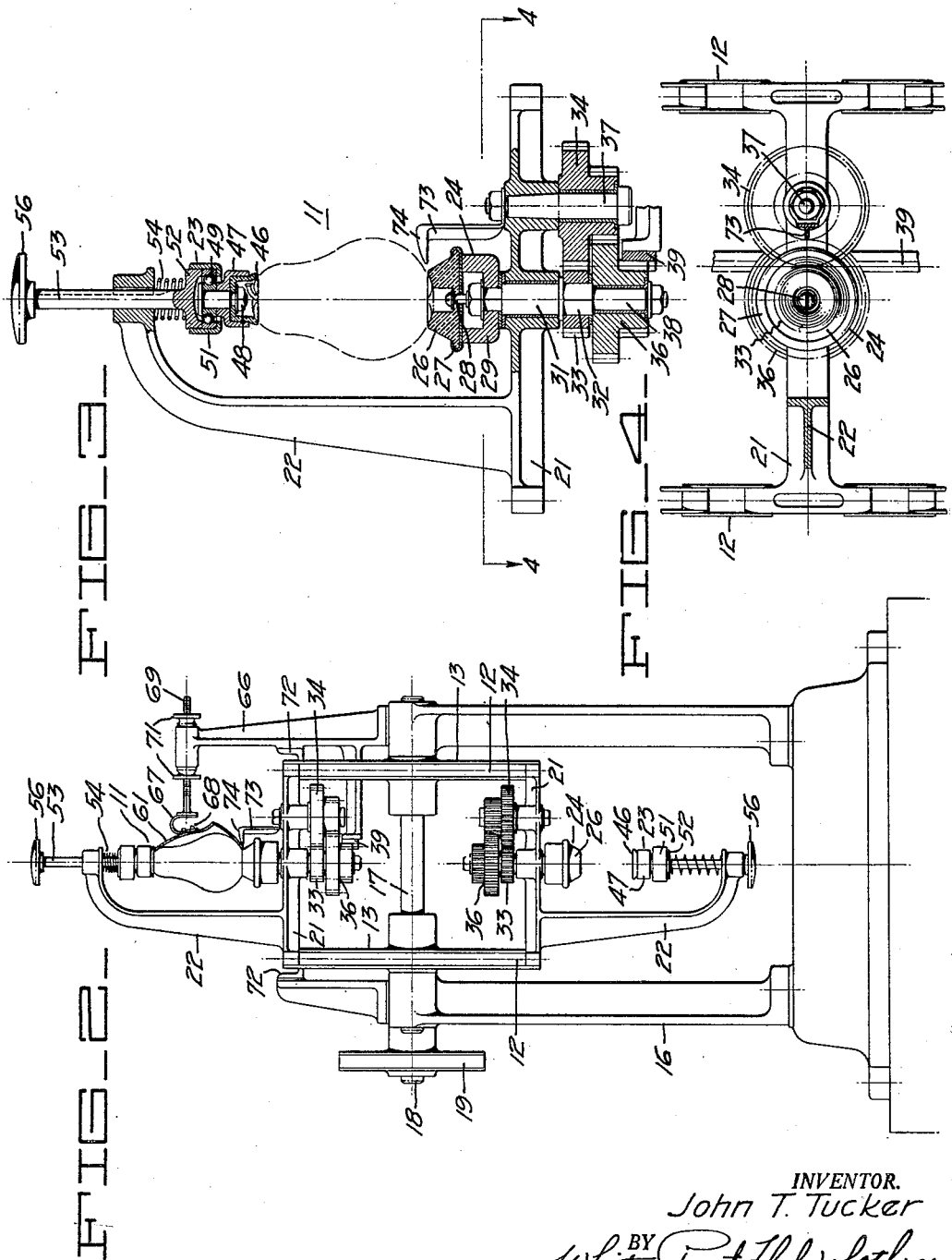
INVENTOR.
John T. Tucker
BY White, Prost, Flehr & Lothrop
ATTORNEYS.

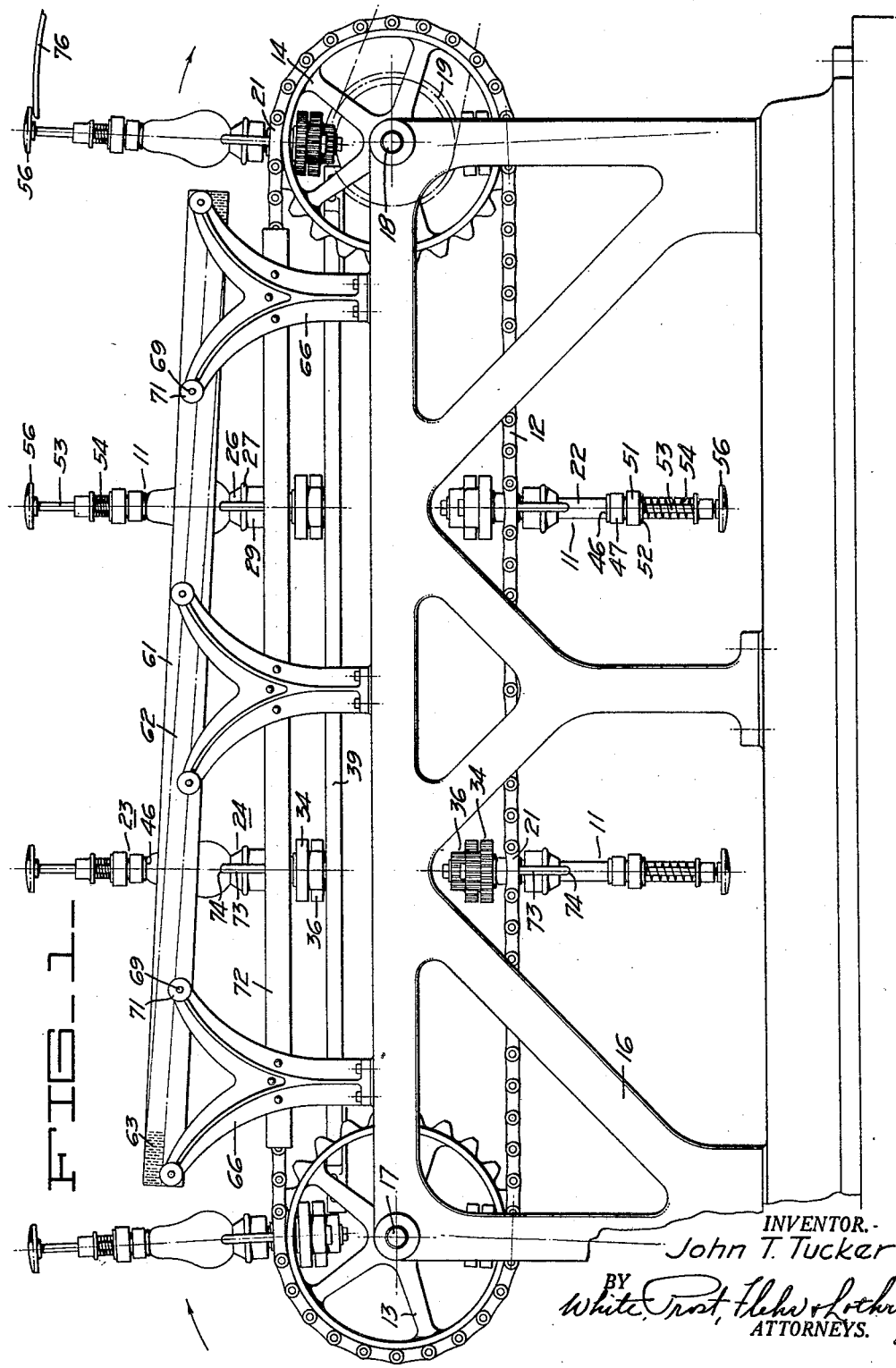

April 25, 1933.   J. T. TUCKER   1,905,578
FRUIT PEELER
Filed March 29, 1930   3 Sheets-Sheet 3
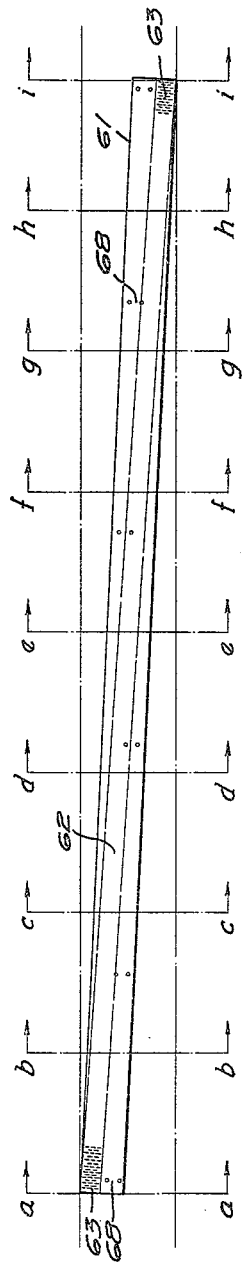
FIG-5-
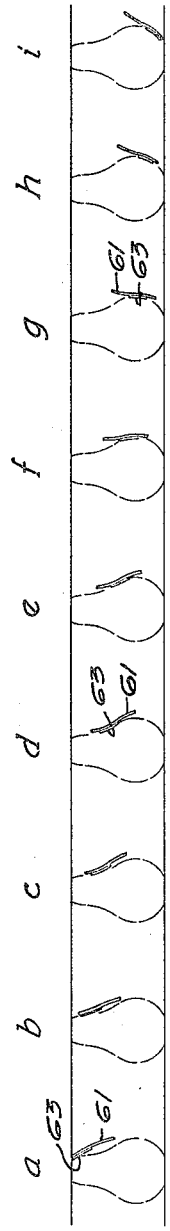
FIG-6-
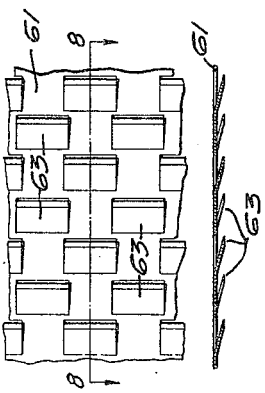
FIG-7-
FIG-8-
INVENTOR.
John T. Tucker
BY White, Prost, Fliew & Lothrop
ATTORNEYS.

Patented Apr. 25, 1933

1,905,578

UNITED STATES PATENT OFFICE

JOHN T. TUCKER, OF BERKELEY, CALIFORNIA

FRUIT PEELER

Application filed March 29, 1930. Serial No. 439,956.

This invention relates to a device for peeling such articles as fruit and particularly to the peeling of pears. Pears are one of the most difficult fruit products to handle in commercial canning operations due to the peculiar nature of their skin which does not permit of removal by chemical processing as in the case of peaches and, also, because of the fact that the pears can be canned only during a relatively short time period since they are not suitable when too green or too ripe. Since the transition between these conditions takes place in a relatively short time, it is necessary to peel a relatively vast number of pears in a short time, if the pears are to be canned before they are too ripe and spoilage avoided. At the present time, canneries peel pears entirely by hand and are therefore interested in securing a machine capable of performing such operations mechanically to reduce the expense of labor.

It is an object of the present invention to devise a novel fruit peeling machine which is particularly useful for employment with such articles as pears.

One of the difficulties in peeling such an article as a pear is due to the particular configuration or silhouette of the pear. While pears, as a rule, have substantially the same silhouette, there is sufficient difference in successive pears to present a considerable difficulty in the way of providing a cutting means capable of conforming to various shapes so that the pears are peeled without undue waste as is occasioned by having to set the peeling means to cut deeply into the pear.

Another object of the present invention is to devise a cutting structure for engagement with an article to remove superficial portions of the surface thereof.

Another object of the present invention is to devise a novel blade structure for the peeling of fruit.

The invention possesses other advantageous features and objects, some of which, with the foregoing, will be set forth at length in the following description where I shall outline in full that form of fruit peeler of my invention which I have selected for illustration in the drawings accompanying and forming part of the present invention. In said drawings I have shown one form of fruit peeler embodying my invention, but it is to be understood that I do not limit myself to such form since the invention, as set forth in the claims, may be embodied in a plurality of forms.

In the drawings, Figure 1 is a side elevation of a fruit peeler embodying my invention.

Figure 2 is an end elevation of the fruit peeler illustrated in Figure 1 showing a pear in position to be peeled.

Figure 3 is an end elevational view of a portion of the pear peeling structure illustrated in Figure 2, the view being partly in section.

Figure 4 is a section on the line 4—4 of Figure 3 illustrating a construction for accomplishing rotation of the fruit.

Figure 5 is an elevation of a blade embodying my invention and adapted to be utilized with the structure shown in Figure 1.

Figures 6 includes views —a— to —i— inclusive which are representations of sections through the blade along the successive sections indicated in Figure 5, the views illustrating the relationship during cutting between the cutters on the blade and the silhouette of such an article as a pear.

Figure 7 is an enlarged view of a portion of the blade showing the cutters provided thereon.

Figure 8 is a section on the line 8—8 of Figure 7 illustrating the relationship between the cutters provided on the blade.

My invention may be briefly characterized as comprising the provision of means for supporting an article while relative rotation occurs between the article and suitable cutting means. In accordance with the present invention this cutting means comprises a cutter which conforms generally with the silhouette of the article and which is provided so that it is adaptable to minor variations present in successive articles.

In the form of the invention shown in the drawings, a plurality of holders 11 are mounted between a pair of chains 12, the chains passing through a rectilinear path between sprockets 13 and 14 spaced at opposite ends of a suitable framework 16 and supported on shafts 17 and 18. Power for rotation of the sprockets is provided by another sprocket 19 positioned upon the shaft 18 and connected to a source of power not shown.

The holders 11 are preferably provided by including bridges 21 as a portion of the chains, the bridges extending between the chains to furnish suitable supports for other structure of the holders to be presently described. Each of the bridges 21 is cast with an extending curved arm 22 which cooperates with the bridge to carry suitable article retaining means indicated generally at 23 and 24.

The retaining means 24 comprises a cup 26 of suitable material as sponge rubber adapted to receive and retain an article by engagement as with the seed end of a pear as indicated in Figure 3. The cup 26 is retained in a suitable mounting 27 and is positioned on a chambered member 29 by means of the screw 28. The chambered member is mounted for rotation with a shaft 31 extending through the bridge 21. The rotation of the shaft is effected by providing a squared portion 32 upon which is mounted a pinion 33. The cup is preferably rotated at a relatively high rate and for this purpose cooperating gears 34 and 36 are respectively provided for rotation upon another shaft 37 which is secured to the bridge 21 and upon a circular extension 38 of the shaft 31. These gears cooperate with the pinion 33 and with a rack 39, secured to the machine framework, so that the cup 26 is rotated at a relatively high rate while the chains pass from the sprocket 13 toward the sprocket 14.

Article retaining means indicated at 23 are provided for supporting the article to be peeled as by engaging the stem end of the pear as shown in Figure 3 so that the article is retained in position on the cup 26 during rotation thereof. As is particularly shown in Figure 3, this means preferably comprises another cup 46 of a suitable resilient material retained in a member 47 by means of a threaded stud, washer and nut indicated at 48. The member 47 is provided in a roller bearing 49 so that rotation of the cup can take place with ease. The roller bearing is positioned by means of a screw collar 51 securing the bearing to a piston 52 carried on a rod 53 which extends through the arm 22. A spring 54 is preferably positioned between the piston and the arm 22 so that the cup 46 is biased and retains the fruit in position during rotation. For convenient manipulation, a handle 56 is provided on the rod so that fruit may be positioned and removed from between the cups.

In accordance with the present invention, I provide means for removing superficial portions of the pear while relative rotation occurs between the pear and the removing or peeling means. This means preferably is of such a nature that it is capable of accommodating itself and providing for minor variations in the article and between successive articles being peeled so that lack of symmetry about the axis of the articles does not result in undue and unnecessary wastage of the flesh of the pear. As is particularly shown in Figures 5 to 8 inclusive, this means preferably comprises a relatively long thin blade 61 formed of a suitable material as steel and provided throughout its length with a path 62 of cutters 63 preferably rectangular. The blade, when viewed in end elevation, is provided to conform to the silhouette of the fruit so that upon relative rotation of the fruit with respect to the blade, superficial portions of the fruit are removed so that it is peeled. This is particularly shown in Figures 5 and 6 wherein the successive sections taken show the blade portions as conforming to successive portions of the silhouette of the fruit and forming an envelope curve thereof. The blade has generally a regular trapezoidal shape and the path 62 of the cutters 63 extends across it diagonally. This facilitates the provision of the cutters and, also, the mounting of the blade so that a greater relative flexibility of the blade is possible, particularly at the ends.

The blade is secured in cutting position on the machine by a plurality of forked arms 66 which support the blade angularly with respect to the path traversed by the articles to be peeled.

I preferably mount the blade on a plurality of springs 67 of a horseshoe shape which are secured at one end as by rivets 68 to the blade while the other end of the springs is secured to threaded shafts 69 adjustably positioned with respect to the arms 66 by means of thumb screws 71. This structure permits of the adjustment of the blade to a desired position and also provides that it is resiliently mounted so that it can conform to any irregularity or wide difference in configuration of successive articles while ensuring that the cutters are held in engagement with the superficial portions of the fruit as it is removed relative to the cutters.

To support the chains and bridges as they pass between the sprocket 13 and the sprocket 14 so that fruit is maintained in a predetermined relative position longitudinally with respect to the blade, pairs of angles 72 are preferably secured upon the machine to engage and support the chains and bridges.

In operation, the fruit holding means are advanced over the rectilinear path traversed by the chains 12, the fruit being positioned in the holders by an operator as the holding means advance about the sprocket 13 so that the fruit is positioned before being brought into initial contact with the blade. Before contact of the fruit with the blade, the rack 39 is engaged and the article is rotated very rapidly as it advances with respect to the blade, a point on the surface of the fruit traversing a cycloidal path with respect to the cutters on the blade.

To ensure that the seed end of the fruit is peeled to as great an extent as is possible, I provide fingers 73 on the bridge, the fingers having cam surfaces 74 which are formed to urge the knife in positively to cut the lower edges of the fruit to some extent. If desired, a similar mechanism can be provided for the stem end.

When the fruit has advanced past the blade, the handle 56 is preferably engaged with suitable cam means 76 so that it is lifted and the fruit released to be dropped automatically into a suitable receptacle or other device, the holding means then being returned to be again filled with fruit and the peeling operation repeated.

I claim:

1. A fruit peeler comprising means for advancing a fruit, means for rotating said fruit during the advancement thereof, and a blade having successive portions adapted to operate on successive superficial portions of said fruit during the advancement thereof.

2. A fruit peeler comprising a frame, an elongated, stationary blade on said frame, and means for advancing said fruit bodily over said frame and simultaneously rotating said fruit about its own axis while different portions of said fruit successively contact successive portions of said blade.

3. A fruit peeler comprising means for advancing a fruit in a rectilinear path, means for rotating said fruit about its own axis during the advancement thereof, and an elongated blade inclined to said path, successive portions of said blade contacting successive portions of said fruit during the advancement thereof.

4. A fruit peeler comprising a frame, an elongated, stationary blade on said frame, means for advancing a fruit in a path inclined with respect to said blade, and means for rotating said fruit during the advancement thereof.

5. A fruit peeler comprising means for advancing a fruit in a rectilinear path, and a plurality of cutters arranged in succession adjacent said path, the cutting edges of said cutters when projected onto a plane perpendicular to said path forming an envelope curve substantially coinciding with a portion of the silhouette curvature of said fruit.

6. A fruit peeler comprising a plurality of cutters arranged in succession, the cutting edges of said cutters when projected onto a plane forming an envelope curve substantially coinciding with a portion of the silhouette curvature of the fruit to be peeled, means for advancing said fruit in a rectilinear path to contact said cutting edges, and means for rotating said fruit during the advancement thereof.

7. A fruit peeler comprising a frame, a conveyor mounted on said frame, a fruit holder on said conveyor, means for advancing said conveyor in a predetermined direction, means for concurrently rotating said holder about an axis perpendicular to said direction, and a stationary blade on said frame adapted to contact the surface of a fruit in said holder during a plurality of rotations of said holder.

8. A fruit peeler comprising a frame, a conveyor mounted to advance on said frame, a fruit holder mounted on and adapted to rotate with respect to said conveyor, and a stationary blade mounted on said frame and extending along said conveyor for engaging the surface of a fruit in said holder.

9. A fruit peeler comprising a frame, a conveyor mounted to advance on said frame in a predetermined path, a fruit holder rotatable with respect to and mounted on said conveyor, means for rotating said holder during advancing movement of said conveyor, and a stationary elongated blade mounted on said frame substantially parallel to said path of said conveyor for engaging the surface of a fruit in said holder.

10. A fruit peeler comprising a fruit holder, a relatively long blade for engaging the surface of a fruit in said holder, different portions of said blade being adapted to engage different selected portions only of said fruit, and means for effecting relative rotation and simultaneous relative advancing movement between said blade and said holder said advancing movement being in the direction of the length of said blade.

11. A fruit peeler comprising a frame, a chain conveyor mounted to advance on said frame, a fruit holder rotatably mounted on said conveyor, a rack on said frame, a pinion on said holder adapted to engage said rack for rotating said holder during advancing movement of said conveyor, and a blade resiliently mounted on said frame and extending substantially parallel to said conveyor for engaging a fruit in said holder.

12. A fruit peeler comprising a frame, and a peeling blade resiliently mounted on said frame, said blade including an elongated strip in end elevation substantially conforming to the contour of fruit to be peeled and having a plurality of cutters projecting therefrom.

13. A fruit peeler comprising a frame, and a peeling blade resiliently mounted on said frame, said blade including an elongated resilient strip contoured to present in end elevation an envelope curve substantially conforming to the contour of fruit to be peeled and having a plurality of cutters projecting therefrom.

In testimony whereof, I have hereunto set my hand.

JOHN T. TUCKER.